(12) United States Patent
Woods et al.

(10) Patent No.: US 7,399,392 B2
(45) Date of Patent: Jul. 15, 2008

(54) ELECTROCHEMICAL REFORMER AND FUEL CELL SYSTEM

(75) Inventors: Richard Root Woods, Irvine, CA (US); Rahul Hari Iyer, Long Beach, CA (US); Brook Forest Porter, Long Beach, CA (US)

(73) Assignee: Intelligent Energy, Inc., Long Beach, CA (US)

( * ) Notice: Subject to any disclaimer, the term of this patent is extended or adjusted under 35 U.S.C. 154(b) by 458 days.

(21) Appl. No.: 10/719,915

(22) Filed: Nov. 20, 2003

(65) Prior Publication Data

US 2004/0137290 A1 Jul. 15, 2004

Related U.S. Application Data

(60) Provisional application No. 60/427,824, filed on Nov. 20, 2002.

(51) Int. Cl.
*C25B 9/08* (2006.01)
*H01M 8/18* (2006.01)
*H01M 2/00* (2006.01)

(52) U.S. Cl. .................... 204/263; 429/21; 429/34

(58) Field of Classification Search ............... 204/263; 429/21, 34
See application file for complete search history.

(56) References Cited

U.S. PATENT DOCUMENTS

| | | | |
|---|---|---|---|
| 3,917,520 A | 11/1975 | Katz et al. | |
| 4,155,712 A | 5/1979 | Taschek | |
| 4,629,664 A | 12/1986 | Tsukui et al. | |
| 5,843,297 A | 12/1998 | Schmid et al. | |
| 6,063,517 A * | 5/2000 | Montemayor et al. | 429/31 |
| 6,299,744 B1 | 10/2001 | Narayanan et al. | |
| 6,350,539 B1 | 2/2002 | Wood, III et al. | |
| 6,368,492 B1 | 4/2002 | Narayanan et al. | |
| 6,432,284 B1 | 12/2002 | Narayanan et al. | |
| 6,533,919 B1 | 3/2003 | Narayanan et al. | |
| 6,555,262 B1 * | 4/2003 | Kaiser et al. | 429/34 |
| 6,960,404 B2 * | 11/2005 | Goebel | 429/39 |
| 2001/0045364 A1 | 11/2001 | Hockaday et al. | |
| 2002/0110719 A1 * | 8/2002 | Pien et al. | 429/35 |
| 2003/0215680 A1 * | 11/2003 | Lillis et al. | 429/21 |
| 2003/0226763 A1 | 12/2003 | Narayanan et al. | |
| 2004/0001991 A1 * | 1/2004 | Kinkelaar et al. | 429/38 |
| 2004/0062980 A1 * | 4/2004 | Ren et al. | 429/39 |

FOREIGN PATENT DOCUMENTS

EP 0 764 727 A1 3/1997
JP 2000-034589 2/2002

* cited by examiner

*Primary Examiner*—Susy Tsang-Foster
*Assistant Examiner*—Nicholas A. Smith
(74) *Attorney, Agent, or Firm*—Irell & Manella LLP

(57) ABSTRACT

An electrochemical reformer 1 using reactant feed structures having both hydrophilic and hydrophobic regions to provide mechanisms for the wicking of liquid reactants into reformer 1 and for the separation and removal of gaseous products from reformer 1. The electrical reformer 1 may be combined with a fuel cell, a portion of the output of which is used to power reformer 1, to create a compact, portable power source.

7 Claims, 6 Drawing Sheets

ELECTROCHEMICAL REFORMER AND FUEL CELL SYSTEM

RELATED APPLICATIONS

This application claims priority of Provisional Application No. 60/427,824, filed on Nov. 20, 2002, which is hereby incorporated by reference as if set forth fully herein.

BACKGROUND OF THE INVENTION

1. Field of the Invention

The present invention relates generally to hydrogen reformers and fuel cells and more particularly, to electrochemical hydrogen reformers for producing hydrogen and fuel cells for converting the hydrogen to electricity and the combination of electrochemical hydrogen reformers and fuel cells.

2. Background Art

Two methods are typically used to generate hydrogen—water electrolysis and thermal reforming. The water electrolysis method uses electrical energy and an electrochemical reactor to decompose water into hydrogen and oxygen. The electrochemical reactor can be based on either an acidic or a basic electrolyte. The thermal reforming method uses thermal energy and a catalytic reactor to decompose water and hydrocarbon fuels into hydrogen, carbon dioxide, and carbon monoxide. This is typical of a steam reformer type reactor, but other reactors can also include oxygen, which are known as autothermal reformers and partial oxidation reformers. An electrochemical reformer is a hybrid process that uses electrochemical processes to reform hydrocarbon or alcohol fuels.

What are needed are improved electrochemical reformers, with greater efficiency and long term performance, improve fuel cells and improved combinations of electrochemical reformers and fuel cells.

SUMMARY OF THE INVENTION

In a first aspect, a hydrogen gas generating system is disclosed including a membrane electrode assembly having an anode, a cathode and an ionically conductive membrane therebetween, electrical connections for applying electrical power from a source of electrical power to the cathode and anode, and a non-circulating fuel transport system for transferring a water/fuel mixture by capillary action to the anode to generate the hydrogen gas.

In another aspect, a hydrogen gas generating system is disclosed including a membrane electrode assembly having an anode, a cathode and an ionically conductive membrane therebetween, a fuel transport system for transferring a water/fuel mixture to said anode, and electrical connections for applying electrical power, from a source of electrical power generated by hydrogen gas, to said membrane electrode assembly to produce hydrogen gas, wherein excess hydrogen gas is produced by the membrane electrode assembly beyond the hydrogen gas required by said source of electrical power to provide power to the membrane electrode assembly.

In still another aspect, a hydrogen gas generating system is disclosed including a membrane electrode assembly in the form of a spiral coil.

BRIEF DESCRIPTION OF THE DRAWINGS

The invention will be better understood by reference to the accompanying drawings, which represent an exemplified embodiment of the apparatus in accordance with the invention:

FIG. 5a is an outline view of a coiled configuration of a reformer.

FIG. 5b is an isometric view of the reformer of FIG. 5a.

DETAILED DESCRIPTION OF THE INVENTION

Figure 1:
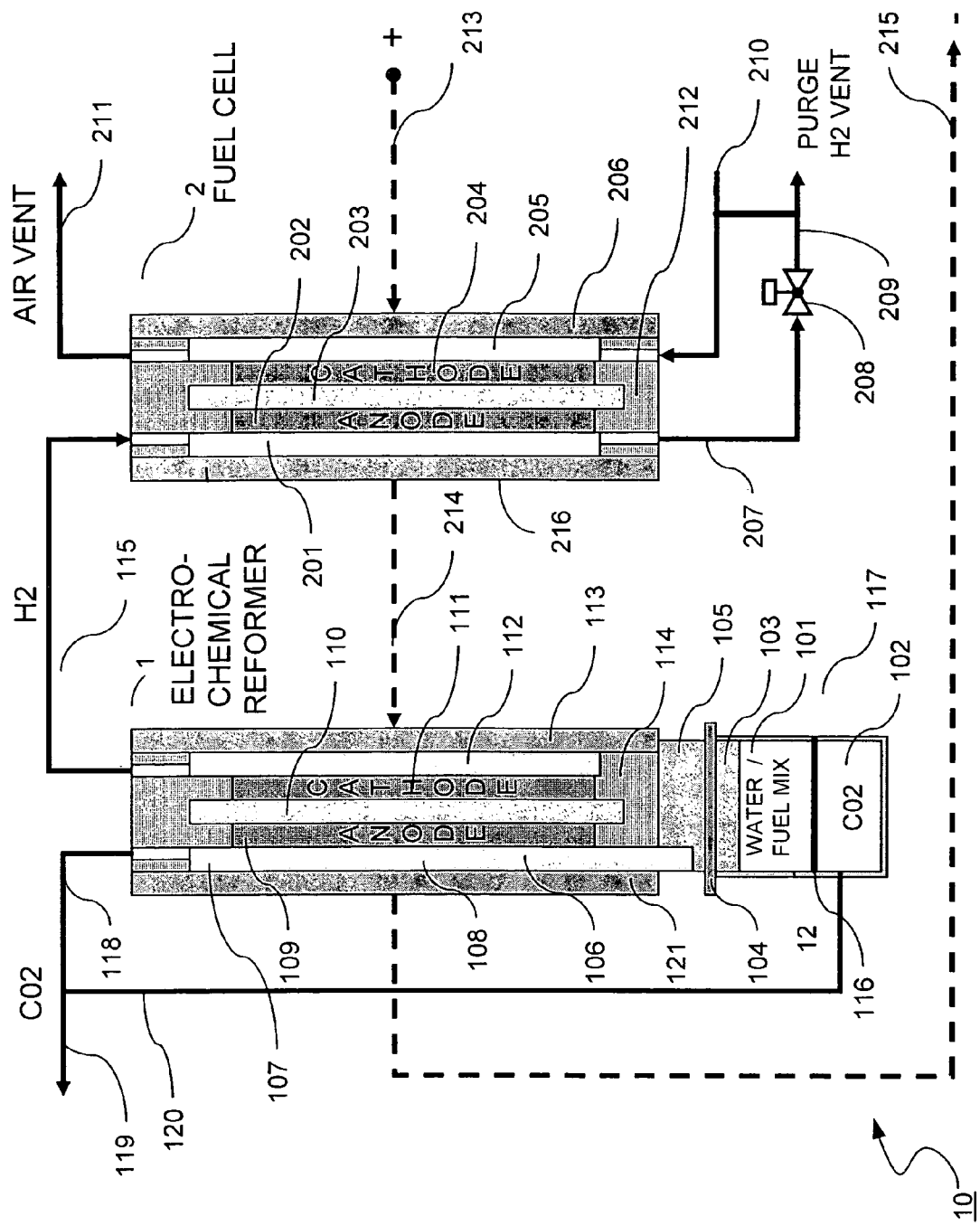
FIG. 1 is a functional view of an integrated electrochemical reformer and fuel cell system.

FIG. 1 is a functional view of integrated electrochemical reformer and fuel cell system 10. Reformer 1 is used to reform organic fuels into hydrogen and carbon dioxide using electrochemical or electrolysis type reactions and non-circulating feed mechanisms. The electrochemical reactor can be based on acidic or basic electrolytes which can be solid-state or aqueous in nature. Reactant feed structures utilizing both hydrophilic and hydrophobic regions provide mechanisms for the wicking of liquid reactants into electrochemical reformer 1 and for the separation and removal of gaseous products from electrochemical reformer 1. A low-cost, high efficiency, portable hydrogen generator, such as system 10, can be made based on reformer 1 with organic fuels such as—but not limited to—methanol. A compact portable power device can be made based on combining reformer 1 with hydrogen fuel cell 2, whereby hydrogen produced from reformer 1 is used to generate electricity via fuel cell 2, a portion of which is used to drive reformer 1.

Reformer 1 is an electrochemical device for hydrogen generation from organic fuels that uses electricity and/or thermal energy, one not necessarily excluding the other, to supply the necessary reaction energy for conversion of fuel into hydrogen. Reformer 1 may contain one or more cells, forming a stack, each cell containing an ion conducting solid-state membrane with anode and cathode catalysts to facilitate the oxidation and reduction reactions and the formation of diatomic hydrogen. Organic fuel is fed into reformer 1 using a non-circulating fuel transport system employing capillary diffusion and/or other physical forces in a combination of hydrophilic and hydrophobic materials to optimize surface coverage of reactants and allow for effective release of gaseous products, reducing the need for costly and bulky ancillary equipment while allowing for a compact, portable, and efficient hydrogen generator.

A porous wicking structure is used to promote capillary diffusion of the fuel—water mixture into reformer 1. A tailored hydrophilic and hydrophobic, porous wicking structure supports the capillary diffusion and helps to optimize surface coverage of reactants and allow for effective release of gaseous products without the need for external circulation.

Reformer 1 and fuel cell 2 are integrated in system 10 to produce electrical power in which the cell-amps of reformer 1 are greater than or equal to the cell-amps of fuel cell 2.

Reformer 1 uses non-circulating feed mechanisms and can be based on acidic or basic electrolytes which can be solid-state or aqueous in nature. Reactant feed structures utilizing both hydrophilic and hydrophobic regions provide mechanisms for the wicking of liquid reactants into reformer 1 and for the separation and removal of gaseous products from reformer 1. A low-cost, high efficiency, portable hydrogen generator, such as system 10, can be made this way with organic fuels, such as but not limited to methanol.

Reformer 1 converts organic hydrocarbon fuels into hydrogen using a non-circulating fuel transport system, as that term is used herein, in which the reactants are fed into reformer 1 through a wick structure as opposed to a circulated feed mechanism.

A compact portable power device such as system 10 may combine wick feed electrochemical reformer 1 with hydrogen fuel cell 2 so that the hydrogen produced from reformer 1 is used to generate electricity, a portion of which is used to drive reformer 1.

Integrated system 10 may control the power produced so that the cell-amps of reformer 1, in terms of the amount of $H_2$ produced, are greater than or equal to the cell-amps of fuel cell reactor in terms of the amount of $H_2$ consumed.

Figure 4:
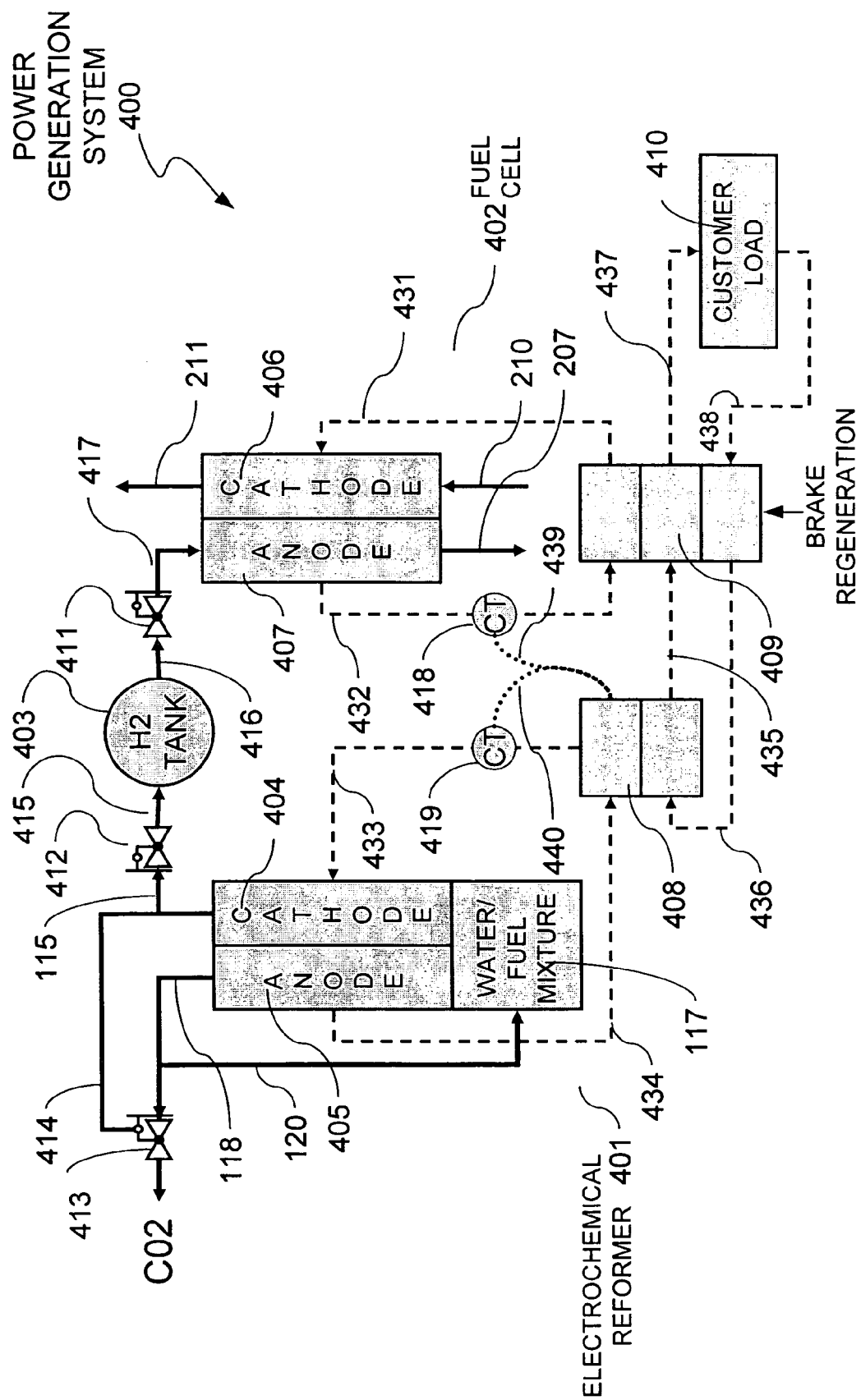
FIG. 4 is an integrated system including hydrogen storage and independent power conditioning modules.

A hydrogen storage device, such as $H_2$ storage tank 403 shown in FIG. 4, may be integrated between reformer 1 and fuel cell 2 to allow for at least partially independent operation of these devices. The $H_2$ from $H_2$ storage tank 403 can be used to initiate system operation of fuel cell 2 to generate power, which in turn is used to initiate operation of the reformer 1. Once full pressure conditions are established in reformer 1, product $H_2$ from reformer 1 is used to refill $H_2$ storage tank 403. The current flowing to reformer 1 and fuel cell 2 is independently controlled by dedicated power modules, but on average over the operating cycle the cumulative cell-amps of reformer 1, that is, the amount of $H_2$ electrochemically generated, are still maintained greater than the cumulative cell-amps of fuel cell 2, that is, the amount of $H_2$ electrochemically consumed, to support fuel cell 2 anode stoichiometric ratios greater than unity.

Power generation system 10 with electrochemical reformer 1, fuel cell 2, hydrogen storage tank 403, and independent power conditioning modules may be configured so that reformer 1 can be operated somewhat independently of fuel cell 2 to increase system flexibility, to enhance cycle start-up, and to support energy storage from regenerative customer loads.

Figures 5A, 5B:
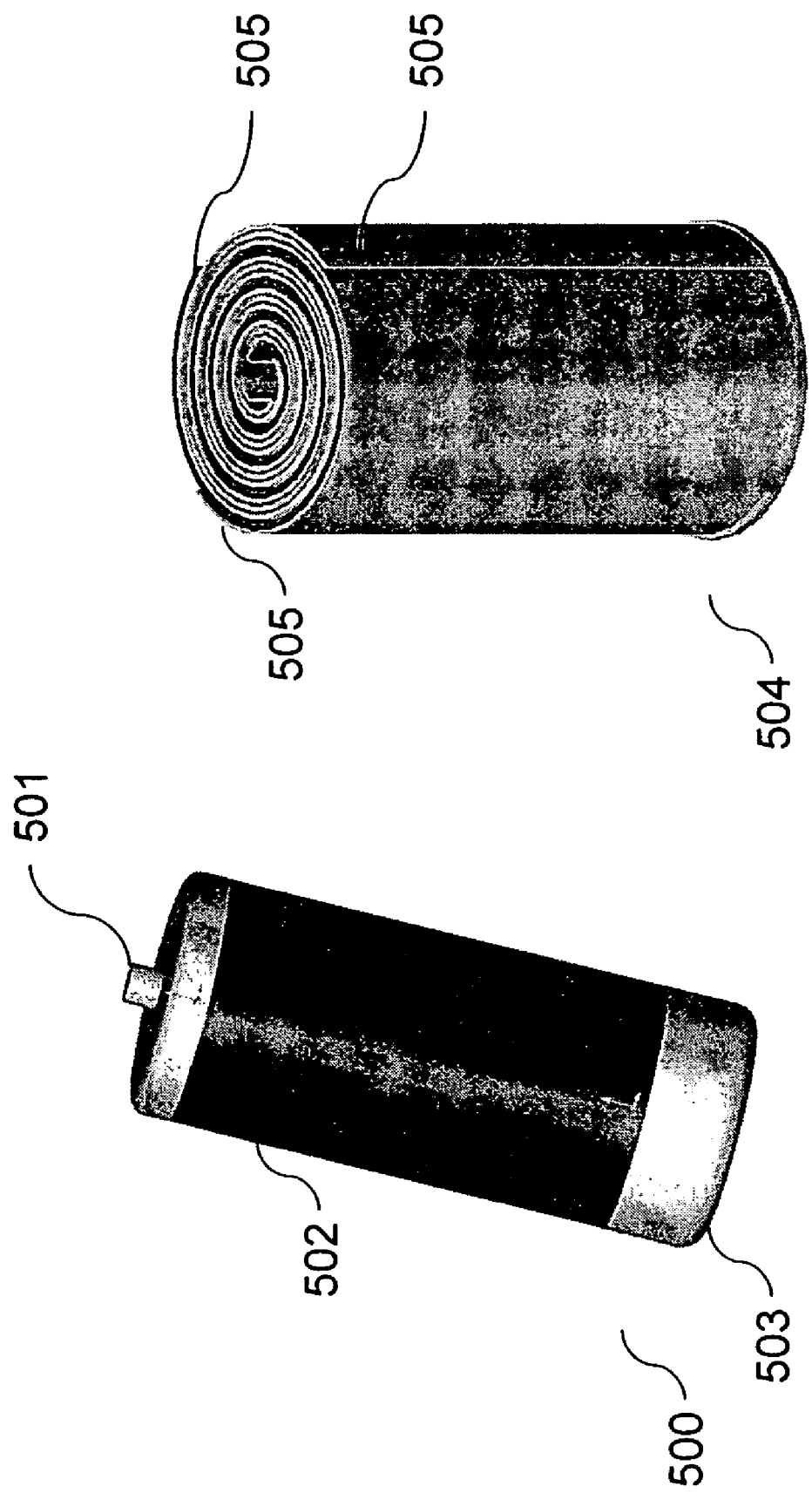
Figure 5C:
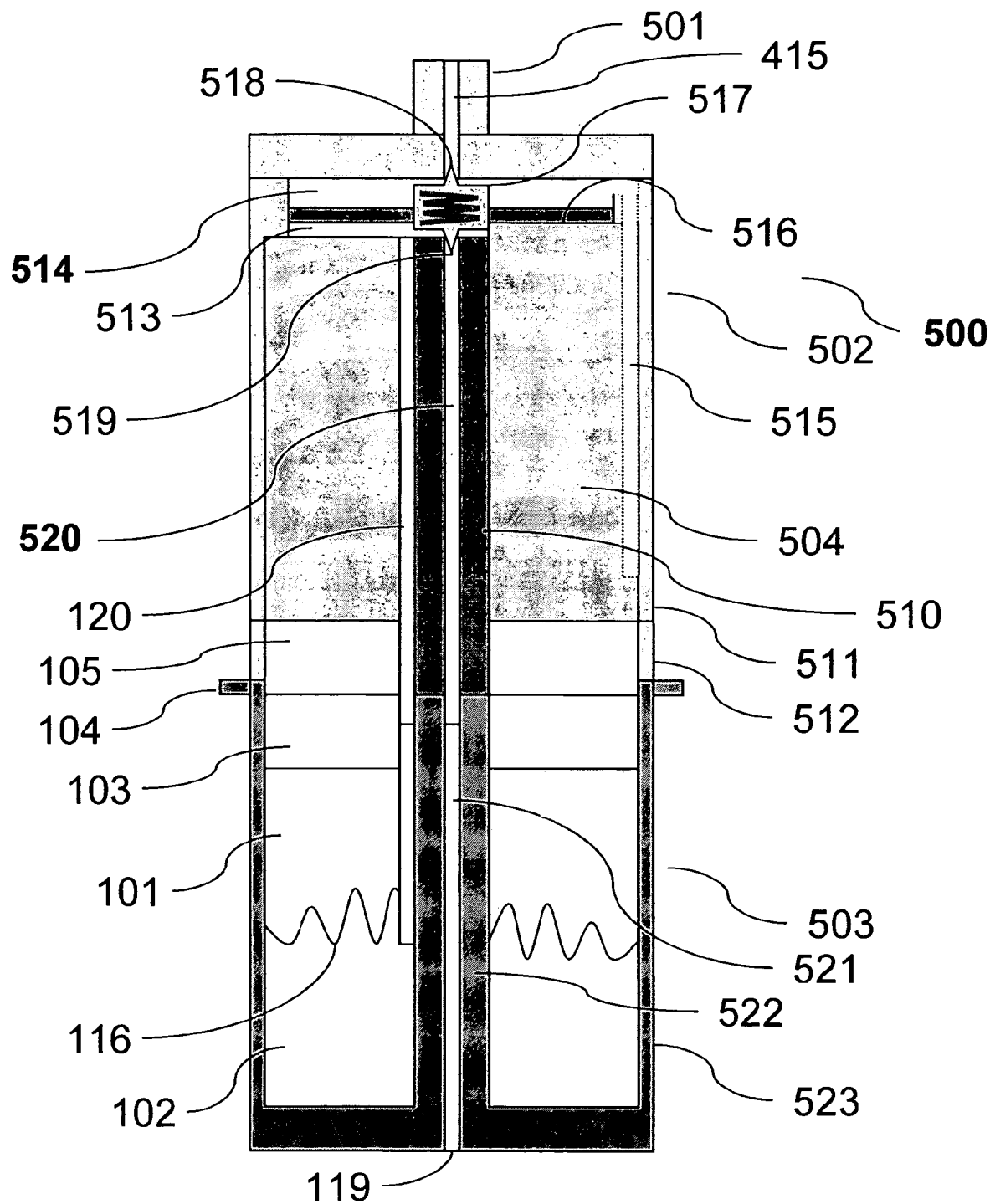
FIG. 5c is a cross sectional view of the reformer of FIGS. 5a and 5b.

Reformer 1 may use a coiled cell configuration, as shown for example in FIGS. 5$a$, $b$ and $c$ to eliminate the requirements of end plates and maximize energy density in a low cost packaging configuration. The coiled configuration of reformer 1 may integrate back pressure regulating valves or regulators 412 and 413 shown in FIG. 4 into the housing assembly to further minimize product cost and enhance system level packaging options.

Referring now again to FIG. 1, reformer 1 generates hydrogen gas which flows through product $H_2$ line 115 to fuel cell 2. Fuel, such as but not limited to $CH_3H$, and water mixture 101 is contained in canister 117. Water fuel mixture 101 is wicked into hydrophilic interface wick structure 103. This structure 103 is in contact with hydrophilic interface wick structure 105 and transfers fuel water mixture 101 to hydrophilic interface region 103 and then to hydrophilic interface 105. Hydrophilic interface 105 is in contact with anode support structure 108 and more specifically, in contact with hydrophilic region 106 of anode support structure 108 so that mixture 101 flows into the anode region of reformer 1. Hydrophilic region 106 is in contact with anode 109 of reformer 1 which allows water fuel mixture 101 to support the anode side electrochemical reaction:

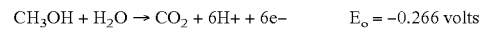

The hydrogen ions H+ generated in the reaction enter ionically conductive membrane 110, which is in contact with anode 109. The hydrogen ions H+ flow through ionically conductive membrane 110 and enter cathode 111 of reformer 1. The electrons e-generated in the anode side reaction flow into anode 109, through electrically conductive anode support 108, into current collector 121, and into anode electrical connection 215 to a load, such as load 410, shown below in FIG. 4. The carbon dioxide $CO_2$ generated in the anode side reaction flows into hydrophobic region 107 of anode support 108. Hydrophobic region 107 is in fluid connection with $CO_2$ line 118 for venting through $CO_2$ vent line 119. Hydrophobic region 107 is also in fluid connection with $CO_2$ supply line 120 connected to gas pressure chamber 102 of canister 117 which is separated from water fuel mixture by diaphragm 116. The pressure applied by $CO_2$ from $CO_2$ supply line 120 in gas pressure chamber 102 promotes the flow of fuel water mixture 101 into the electrochemical reformer 1 by applying pressure to water fuel mixture 101 in canister 117. $CO_2$ supply line 120 can be external or can be internal to reformer 1 module. Alternatively the $H_2$ product gas in line 115 can be used to reference chamber 102.

Canister 117 may conveniently be removable and replaceable so that an expended canister can easily be replaced with a canister having a full supply of water fuel mixture 101.

The H+ ions in cathode 111 react with electrons e- from electrical connection 214 between fuel cell 2 and reformer 1. These electrons flow into cathode side current collector 113 through the conductive cathode support 112 and into cathode 111. This reaction forms Hydrogen gas $H_2$ according to the cathode side electrochemical reaction:

The $H_2$ gas flows into cathode support structure 112, which is in fluid connection with $H_2$ line 115 between reformer 1 and fuel cell 2. The overall electrochemical reaction for reformer 1 is:

Anode Reaction:

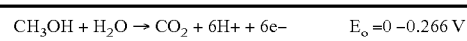

Cathode Reaction:

Overall Reaction:

Reformer 1 can also be based on aqueous basic electrolytes such as but not limited to sodium hydroxide, potassium carbonate, rubidium/cesium/potassium hydroxide, anion exchange membrane, etc. In reformer 1, the overall reactions are similar to the acid type reactors, except the water can also be fed to the cathode independent of the fuel feed to the anode. The electrochemical half cell reactions are the following:

Anode Reaction:

$$CH_3OH + 6OH^- \rightarrow CO_2 + 5H_2O + 6e^- \qquad E_o = 0.564$$

Cathode Reaction:

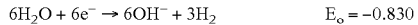

$$6H_2O + 6e^- \rightarrow 6OH^- + 3H_2 \qquad E_o = -0.830$$

Overall Reaction:

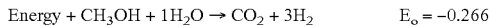

$$Energy + CH_3OH + 1H_2O \rightarrow CO_2 + 3H_2 \qquad E_o = -0.266$$

Referring now to fuel cell 2, as shown in FIG. 1, $H_2$ enters anode support flow field 201 of fuel cell 2. The $H_2$ reacts at anode 202 of fuel cell 2 according to fuel cell anode side electrochemical reaction:

$$3H_2 \rightarrow 6H^+ + 6e^- \qquad E_o = 0.00 \text{ V}$$

The H+ ions enter ionically conductive membrane 203 of fuel cell 2 and flow to cathode 204 where they react with oxygen from the air that flows through cathode side flow field 205 from connection 210 and out through vent 211. The cathode side electrochemical reaction of fuel cell is the following:

$$1.5O_2 + 6H^+ + 6e^- \rightarrow 3H_2O \qquad E_o = 1.23 \text{ V}$$

Fuel cells, such a fuel cell 2, typically operate at anode side stoichiometric ratios of greater than 1.0 to allow periodic purging of $CO_2$ contamination in anode flow field 201. This purging may be accomplished through line 207 by activating purge valve 208 connected via line 209 to air vent 211 for venting to a safe location. Line 209 can be connected to cathode side inlet line 210 to prevent $H_2$ gas release from the system.

One embodiment of the electrical circuit of system 10 is indicated in FIG. 1. Fuel cell 2 generates energy due to the half cell reactions at cathode 111 and anode 109 and establishes a positive potential at cathode electrical connection 213 with respect to electrical connection 214 between fuel cell 2 and electrical reformer 1. Since reformer 1 consumes power, it establishes a negative potential between electrical connection 214 and anode electrical connection 215. The current in amps, or quantity of electrons flowing through fuel cell 2 and the reformer 1, are equal due to this series connection. As long as the positive voltage between cathode electrical connection 213 and electrical connection 214 established by fuel cell 2 is greater than the negative voltage between electrical connection 214 and anode electrical connection 215 established by reformer 1, the overall electrical system will have a net positive voltage as measured between cathode electrical connection 213 and anode electrical connection 215. The relative cell areas of the reformer 1 and fuel cell 2 can be adjusted to provide a relative current density as measured in amps per area between fuel cell 2 and reformer 1, and therefore, optimize system performance.

The number of "cell-amps" as that term is used herein, is the current flow times the number of cells in the electrochemical reactors. The number of cell-amps of reformer 1 is preferably greater than the number of cell-amps of fuel cell 2. That is, more $H_2$ is produced by reformer 1 than is consumed by fuel cell 2. This excess of $H_2$ is required to allow for loss of $H_2$ gas from fuel cell anode 202 due to periodic cycling of the purge valve 208. The amount of hydrogen generated in reformer 1 per cell-amp is equal to the amount of hydrogen consumed in fuel cell 2 per cell-amp based on the electrochemical half cell reactions discussed above. This rate is equal to $5.18 \times 10^{-6}$ moles of $H_2$/sec per cell-amp. To achieve this in the configuration of FIG. 1, the number of cells in reformer 1 may be greater than the number of cells in fuel cell 2. If fuel cell 2 operates at an anode stoichiometric ratio of 1.2 $H_2$ or a utilization of 83.3%, reformer 1 needs 20% more cells than fuel cell 2. If a fuel cell 2 operates at an anode stoichiometric ratio of 1.02, then only 2% more cells are required.

Figure 2:
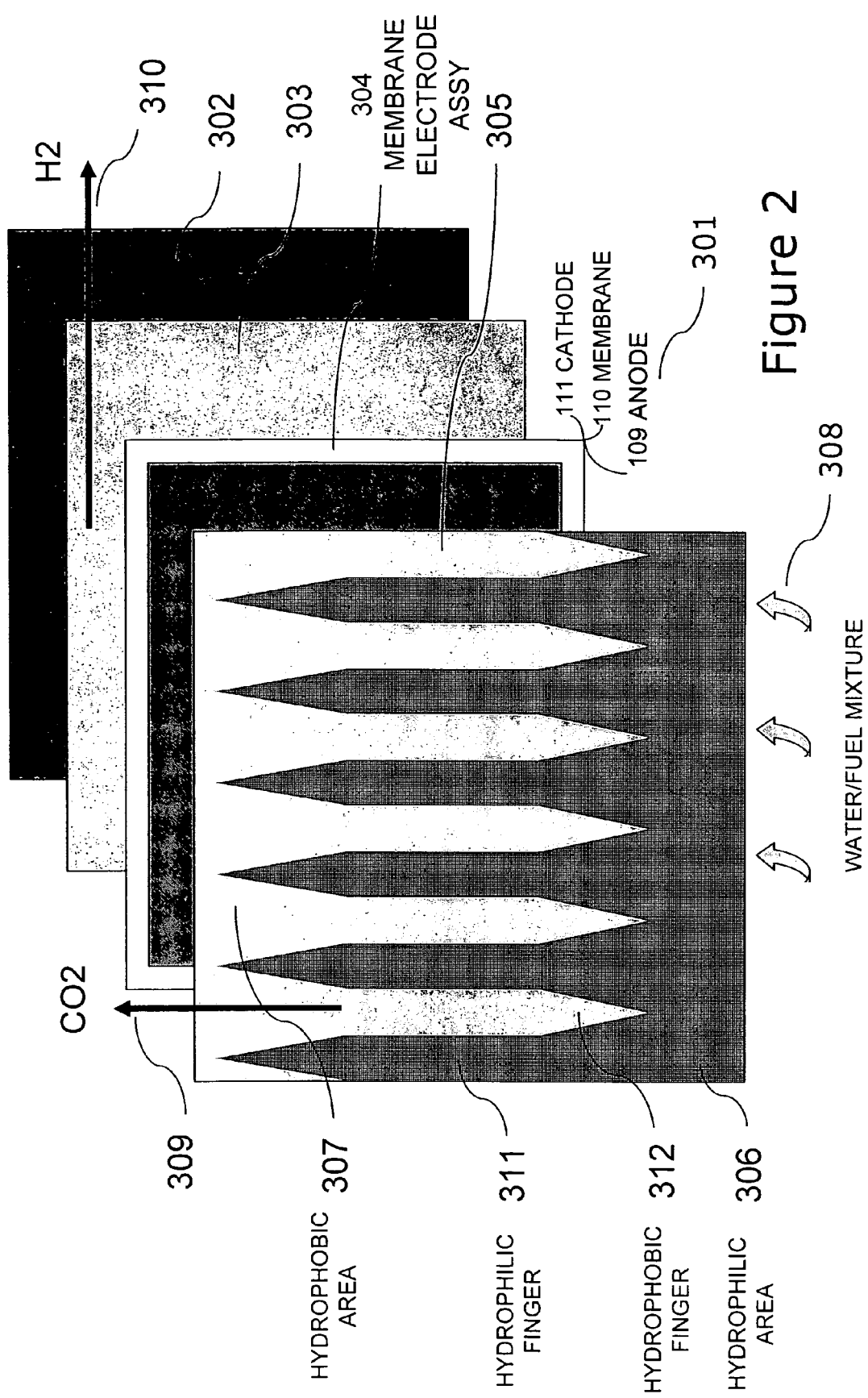
FIG. 2 is an exploded view of the repeat elements of the electrochemical reformer of FIG. 1.

With reference now to FIG. 2, the repeatable elements of one cell 301 of reformer 1 are shown in an exploded view. Reformer cell 301 includes bipolar plate 302, cathode support 303, membrane electrode assembly or MEA 304 and anode support 305. MEA 304 includes anode 109, electrolyte membrane 110 and cathode 111 as shown in FIG. 1. Anode support 305 is composed of two regions, hydrophilic region 306 and hydrophobic region 307. Hydrophilic region 306 pulls fuel water mixture 101 along flow direction 308 into anode support 305 due to capillary forces. As fuel water mixture 101 is consumed in the electrochemical process in reformer 1, hydrophilic region 306 replenishes fuel water mixture 101 in anode support 305, which is designed to include hydrophilic fingers 311 connected together to form the majority of hydrophilic region 306 and hydrophobic fingers 312 connected together to form the majority of hydrophobic region 307. Hydrophilic fingers 311 are interlaced with hydrophobic fingers 312. Hydrophilic fingers 311 provide sufficient coverage of the surface area of anode 109 of reformer cell 301 to ensure sufficient fuel water mixture 101 is made available within anode 109 of the MEA 304. Parallel to hydrophilic fingers 311, but pointing in the opposite direction, are hydrophobic fingers 312. As fuel water mixture 101 is consumed at anode 109, carbon dioxide $CO_2$ is released. This gas flows through the saturated layers of anode 109 and escapes into hydrophobic fingers 312. Since this region is hydrophobic, the gaseous carbon dioxide easily flows through the interconnected porosity of hydrophobic region 307 and flows out of cell 301 as indicated by flow direction 309.

Similarly, the hydrophobic nature of the cathode support 303 allows the product hydrogen $H_2$ generated on the surface of cathode 111 to easily flow out of cell 301 as indicated by flow direction 310. Typically, the anode and cathode support materials are similar to woven carbon fiber cloth that has been treated to enhance the hydrophobic or hydrophilic characteristic with respect to the fuel water mixture. Hydrophobic regions are typically created in electrochemical systems by solution coating regions of the cloth with Teflon® or other polytetrafluoroethylene PTFE type compounds. Other techniques for achieving the desired hydrophobic and hydrophilic characteristic are well known.

Figure 3:
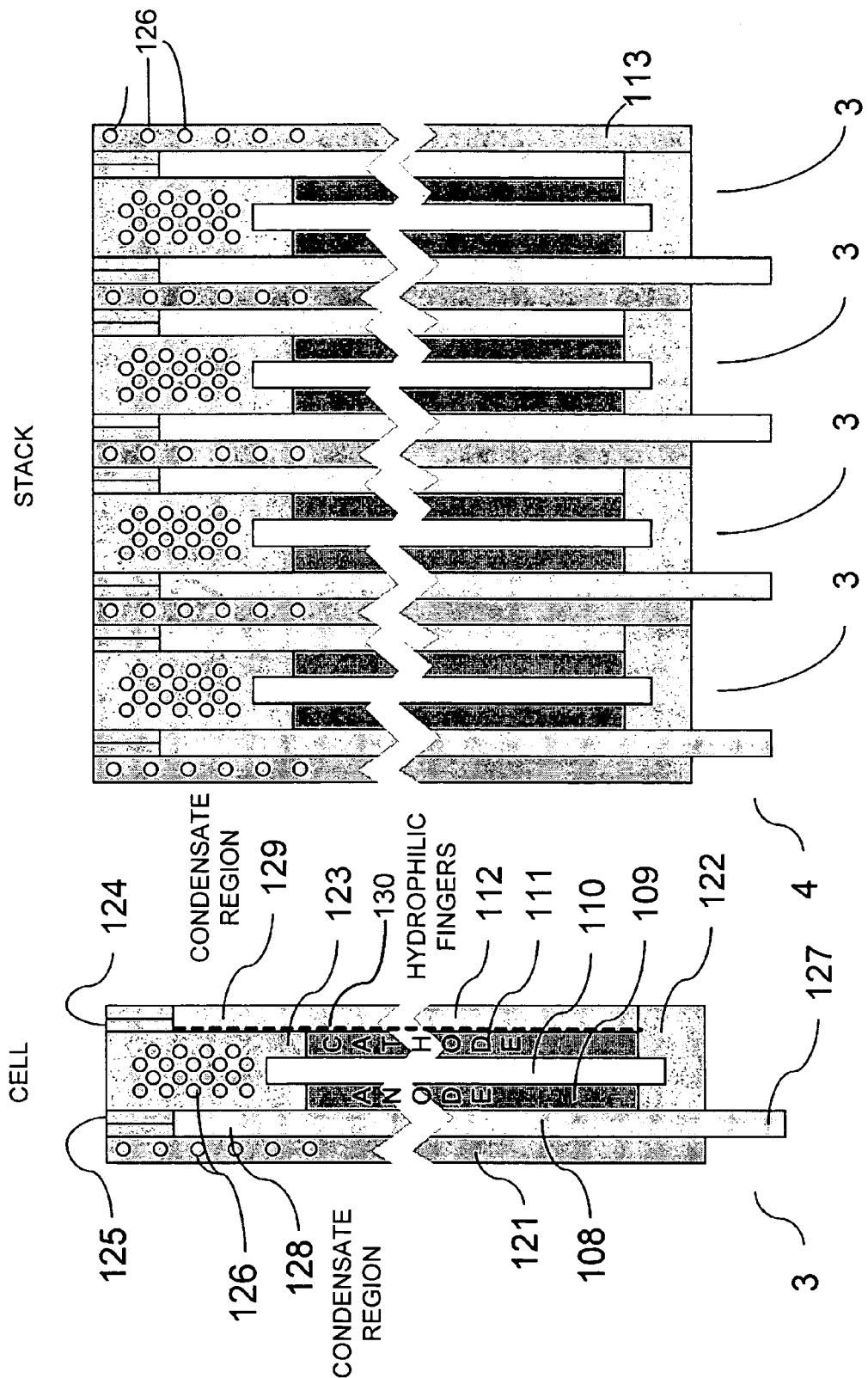
FIG. 3 is a illustrative view of the extended wicking structure and one embodiment of the internal cooling within the cell housing of the electrochemical reformer of FIGS. 1 and 2.

Now referring to FIG. 3, a plurality of individual cells 3, which may be constructed in accordance with cell 301 shown in FIG. 2, may be combined to create multi-cell module 4. Unit cell 3 is similar to reformer 1 shown in FIG. 1 and includes the anode support structure 108, anode electrode 109, membrane 110, cathode electrode 111, cathode support structure 112, and anode side bipolar plate 121. In addition, lower cell housing structure 122 and upper cell housing structure 123 are regions of frame 114 of reformer 1. Extended region 127 of anode support structure 108 is provided to illustrate that when a multi-cell module 4 is assembled, the hydrophilic region of each individual anode support structure 108 extends beyond the module assembly for contact with hydrophilic interface 105 shown in FIG. 1.

Upper cell housing 123 may be equipped with internal cooling ports 126. Internal cooling ports 126 may also be included within the structure of bipolar plates 121 and bipolar plate 113, also shown in FIG. 1. Cooling fluid flows through internal cooling ports 126 to reduce the temperature of the carbon dioxide and hydrogen product gases as they exit through ports 125 and 124 respectively. This cooling effect helps to condense any fuel water mixture 101 in the product gases. Condensate on the anode side soaks into condensate region 128 of anode support structure 108 and as a result of capillary forces is returned to the active surface area of anode 109. Water fuel mixture 101 condensate on the cathode side soaks into condensate region 129 of cathode support structure 112 and is returned by hydrophilic fingers 130 in cathode support structure 112 to the active surface of anode 109. Integration of the internal cooling ports 126 minimizes loss of water fuel mixture 101 during the generation of electricity in fuel cell 3 through evaporation.

Referring now to FIG. 4, power generation system 400 reduces the loss of fuel water mixture 101 through vaporization within the electrochemical reformer 401 by increasing the pressure of the $H_2$ and $CO_2$ product gases. System 400 includes electrochemical reformer 401 having anode side 405 where $CO_2$ is generated, cathode side 404 where $H_2$ is generated, and fuel water mixture canister 117. Power generation system 400 also includes fuel cell module 402 having cathode side 406 and anode side 407 where $H_2$ is consumed to produce electrical power. Power generation system 400 also includes back pressure regulating valve or regulator 412 to control the $H_2$ product gas pressure from cathode side 404 of reformer 401 and back pressure regulating valve or regulator 413 that controls the $CO_2$ product gas pressure from anode side 405 of reformer 401. The pressure of the $CO_2$ exiting anode side 405 may be referenced to the $H_2$ product gas pressure exiting cathode side 404 via connection 414. This arrangement allows cathode side 404 pressure to be maintained at a level greater than, or equal to, anode side 405 pressure. By tailoring the capillary forces of cathode support structure and the cathode in cathode side 404, any liquid carryover through the ionically conductive membrane between anode side 405 and cathode side 404, can be controlled by the differential pressure established by pressure regulator valves 412 and 413. Similarly, any condensate returned from condensation region 129, shown in FIG. 3, to cathode side 404 of reformer 401 may also be controlled by that differential pressure. A differential pressure of between 0.1 and 0.3 atmospheres will be sufficient to push any liquid in the cathode back through the membrane to the anode side. The overall pressure of reformer 401 can be adjusted by appropriate adjustments of backpressure regulators 412 and 413. The overall pressure of reformer 401 may typically be managed between ambient and 10 atmospheres.

Power generation system 400 also includes integrated hydrogen storage tank 403. A simple volumetric or metal hydride storage tank may be used for small-scale systems because of the simplicity and lower pressure/temperature operation, but other storage methods can be used. Hydrogen gas produced by reformer 401 flows through connection 115 via pressure regulating valve 412 to connection 415 and into $H_2$ storage tank 403. Hydrogen from $H_2$ storage tank 403 flows out through connection 416 to forward pressure regulating valve 411 via connection 417 into fuel cell 402. $H_2$ storage tank 403 is used as a buffer tank for power generation system 400 between the excess $H_2$ produced in reformer 401 and the $H_2$ consumed in fuel cell 402 to achieve added operational flexibility. For example, during start-up of power generation system 400, the $H_2$ within fuel cell 2 anode side 407 is consumed reducing the pressure at connection between line 417 and valve 411. Forward pressure regulating valve 411 opens to provide hydrogen from $H_2$ storage tank 403 to flow to fuel cell 2 anode side 407. This removal of $H_2$ from $H_2$ storage tank 403 causes a decreased pressure that promotes the release of hydrogen gas in cathode side 404 of reformer 401. This hydrogen is consumed establishing a positive voltage and generating power, which is used to start-up reformer 401 and generate hydrogen. After the pressure within reformer 401 is established by back pressure regulators 412 and 413, hydrogen begins to flow through connection 415 and into hydrogen storage tank 403. The set point of forward pressure regulator 411 prevents excess hydrogen from flowing to fuel cell 402 and therefore the pressure within $H_2$ storage tank 403 increases allowing the storage capacity to be replenished.

Similar operating logic can be used to enhance the load following characteristics of power generation system 400 by using $H_2$ storage tank 403 to allow flexibility between the power generation and hydrogen generation. Continuing with respect to FIG. 4, as power is generated by fuel cell 402 the electrons flow through electrical connection 432 to power conditioning module 409 and back to fuel cell 402 through electrical connection 431. Power conditioning module 409 takes this unregulated voltage and provides regulated power outputs to two loads, customer or other load 410 and power conditioning module 408 of reformer 401. The regulated voltage input to these loads can be the same or different. During normal operation power from fuel cell 402 is regulated by power conditioning module 409 and provided to the customer or load 410 through electrical connections 437 and 438. Power module 409 also provides regulated power output to power conditioning module 408 through electrical connections 435 and 436. Power conditioning module 408 provides regulated current and voltage to reformer 401 through electrical connections 433 and 434. During normal operation, the current flowing through fuel cell 402 may be measured by current transmitter 418 and provided to the control circuit of power module 408, which is designed to provide a regulated current to reformer 401. The current is regulated by power conditioning module 408 to ensure that the cell-amps flowing through reformer 401 are greater than or equal to the cell-amps flowing through fuel cell 402, therefore the rate of electrochemical $H_2$ production is greater than the rate of electrochemical $H_2$ consumption. The current flowing through reformer 401 may be measured using current transmitter 419 and may be provided to power conditioning module 408. The cell-amps through reformer 401 are maintained to compensate for the $H_2$ lost from the system through fuel cell 402 vent port 207 which is used to establish the anode side stoichiometric ratio of fuel cell 402. $H_2$ storage tank 403 allows for this balance in cell-amps to be averaged over the operating cycle of the system: startup, normal operation, and shutdown permitting current flow adjustments between fuel cell 402 and reformer 401 independently, permitting same or different numbers of cells to be used in both modules.

In applications that have regenerative cycles, such as a hybrid vehicle, customer load 410 can generate power as well as consume energy. The use of independent power condition modules 409 and 408 and $H_2$ storage tank 403 provides added flexibility. During peak power requirements, such as when the vehicle is accelerating, additional hydrogen can be removed from $H_2$ storage tank 403 and fed to fuel cell 402. During regeneration cycles, such as when the vehicle is braking, power from the load created by regeneration can be fed to power module 409 reducing or eliminating the current flow through fuel cell 402. This regenerative braking power is conditioned by power module 409 and fed to power module 408, which in turn drives current through reformer 401 to generate $H_2$. Since $H_2$ is not being consumed by fuel cell 402, forward pressure regulator 411 closes and the pressure in $H_2$ storage tank 403 increases as a result of storing the $H_2$ generated by the regenerative braking energy. When high energy demand is required, hydrogen can be drawn from $H_2$ storage tank 403 to generate additional power for customer load 410. In addition, replenishment of $H_2$ in $H_2$ storage tank 403 may be accomplished during low load periods by increasing the relative cell-amps in reformer 401 with respect to fuel cell 402. In these systems, current flow to reformer 401 and fuel cell 402 are managed to maintain hydrogen storage tank 403 at approximately 50% full. If the hybrid vehicle application is focused more on peaking power needs, hydrogen storage tank 403 may be maintained at approximately 65 to 75% full, while applications focused more on regenerative energy recovery, hydrogen storage tank 403 may be maintained at approximately 25 to 35% full. The relative sizing of the storage is $1.87 \times 10^{-2}$ moles $H_2$ per cell-amp hour.

Referring now to FIG. 5, conventional electrochemical cells, such as fuel cells, may be designed to be stacked and placed between two end-plates that provide compressive forces on the active area and seals, as shown generally in FIG. 3. Coiled electrical reformer 500 includes electrochemical reformer assembly 502 and fuel water canister assembly 503. Reformer assembly 502 is equipped with $H_2$ outlet connection 501 which may serve as one electrical terminal of reformer 500. Fuel water canister assembly 503 may serve as the other electrical terminal.

Groups of electrochemical reformer cells 505 are assembled and coiled in a spiral coil around center core 510 to create assembly 504. Assembly 504 is wrapped with an outer compression shell 511 to provide containment and compressive forces on the active areas of the reformer cells. Extended hydrophilic regions 127 of anode support structures 108, shown in FIG. 3, are in close contact with hydrophilic region 105, which is wrapped with non-electrically conductive shell 512. $CO_2$ gas volume 513 is in flow communication with $CO_2$ outlet ports 125, shown in FIG. 3, of each cell 505. $H_2$ gas volume 514 is in flow communication with $H_2$ outlet ports 124, also shown in FIG. 3.

$CO_2$ gas volume 513 and $H_2$ gas volume 514 are separated by differential pressure diaphragm 516 that has spring force exerted upward to cause $H_2$ gas volume 514 to be at a greater pressure than $CO_2$ gas volume 513. Integrated valve element with internal compression spring 517 functions to establish overall backpressure on reformer product gases. Valve element 517 has upper valve stem 518 and lower valve stem 519. Upper valve stem 518 fits within exit connection 415 to create a back pressure on $H_2$ gas volume 514, while lower valve stem 519 fits within center flow channel 520 of center core 510. Valve stems 516 and 517 function as backpressure regulating valves 412 and 413 as shown in FIG. 4. $H_2$ gas generated by the anode section of each reformer cell 505 flows into collection region 515 and into gas volume 514. Tolerance fit between upper valve stem 518 and exit connection 415 applies backpressure on cathode side of each cell 505, as shown for example as cathode side 404 in FIG. 4. $H_2$ product gas exits channel 415 and flows toward fuel cell. $CO_2$ gas exits through channel 520 that interconnects with channel 521 and out through $CO_2$ vent line 119. The $CO_2$ gas at pressure in gas volume 513 is in fluid connection with $CO_2$ supply line 120 that is in flow connection with gas volume 102 of the fuel water canister 503. This connection allows a pressure balance within fuel water canister 503.

Fuel water canister 503 includes hydrophilic interface region 103 that is in contact with region 105 of reformer assembly 500. Fuel water mixture from cavity 101 is pulled into interface region 103 and into region 105 by capillary forces. This fuel water mixture finally flows into the anode support structures of each cell 505. Diaphragm 116 adjusts as reformer assembly 500 consumes fuel water mixture. A volume balance within the canister is maintained due to $CO_2$ supply line 120. Electrons flowing from the anode end cells flow into the outer shell 511 and continue to connection 501. Electrons returning to reformer assembly 500 flow into through the outer shell of the canister 523, center rod 522, center core rod 510 and into the cathode side end cell of reformer assembly 500.

We claim as our invention:

1. A hydrogen gas generating system, comprising:
    a membrane electrode assembly including an anode, a cathode and an ionically conductive membrane there between;
    electrical connections for applying electrical power from a source of electrical power to said cathode and anode; and
    a non-circulating transport layer of wicking material for transferring a water/fuel mixture by capillary action from a first end portion of the layer of wicking material from a source of the water/fuel mixture to said anode to generate hydrogen gas and for transferring gases released by consumption of the water/fuel mixture away from the anode by capillary action to a vent through a second end portion of the layer of wicking material.

2. The hydrogen gas generating system of claim 1, wherein said non-circulating transport layer of wicking material further comprises:
    the first end portion of the layer of wicking material is in contact with the water/fuel mixture for transporting the water/fuel mixture to the anode and the second end portion of the layer of wicking material is in contact with said first end portion of the layer of wicking material for collecting gases therefrom.

3. The hydrogen gas generating system of claim 2, wherein areas of said first and second end portions of the layer of wicking material are interspersed along the contact between the first and second end portions thereof.

4. The hydrogen gas generating system of claim 2, wherein said areas of said first and second end portions of the layer of wicking material are interlaced.

5. The hydrogen gas generating system of claims 2 or 3, wherein said first end portion of the layer of wicking material is hydrophilic; and said second end portion of the layer of wicking material is hydrophobic.

6. The hydrogen gas generating system of claims 2 or 3 comprising:
    a replaceable fuel/water canister for containing the fuel/water mixture in contact with the first end of the layer of wicking material; and
    a compartment receiving the released gases from the second end of the wicking layer, under pressure resulting from the release of the gases by consumption of the water/fuel mixture, for pressurizing the replaceable water/fuel mixture canister.

7. The hydrogen gas generating system of claim 1 further comprising:
   a cooling system within said membrane electrode assembly for recovering liquid from gases produced by said membrane electrode assembly; and
   a layer of hydrophilic wicking material for returning the condensed water/fuel mixture to said cathode.

* * * * *